(12) United States Patent
McGrew et al.

(10) Patent No.: US 8,316,236 B2
(45) Date of Patent: Nov. 20, 2012

(54) DETERMINING SECURITY STATES USING BINARY OUTPUT SEQUENCES

(75) Inventors: David McGrew, Poolesville, MD (US); Mark Baugher, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 1100 days.

(21) Appl. No.: 11/848,582

(22) Filed: Aug. 31, 2007

(65) Prior Publication Data

US 2009/0060188 A1 Mar. 5, 2009

(51) Int. Cl.
*H04L 9/32* (2006.01)
(52) U.S. Cl. .......... 713/171; 380/30; 380/270; 380/277; 380/259
(58) Field of Classification Search .................. 713/171; 380/259, 270, 277, 30
See application file for complete search history.

(56) References Cited

U.S. PATENT DOCUMENTS

| | | | |
|---|---|---|---|
| 6,226,383 B1* | 5/2001 | Jablon | 380/30 |
| 6,346,890 B1* | 2/2002 | Bellin | 340/825.52 |
| 2004/0073801 A1* | 4/2004 | Kalogridis et al. | 713/176 |
| 2004/0117623 A1* | 6/2004 | Kalogridis et al. | 713/165 |
| 2005/0077349 A1* | 4/2005 | Bonalle et al. | 235/380 |
| 2005/0141706 A1* | 6/2005 | Regli et al. | 380/44 |
| 2006/0005033 A1* | 1/2006 | Wood | 713/182 |
| 2006/0050866 A1* | 3/2006 | Sewall | 379/428.02 |
| 2006/0187890 A1* | 8/2006 | Lin | 370/338 |
| 2007/0198432 A1* | 8/2007 | Pitroda et al. | 705/64 |
| 2008/0043626 A1* | 2/2008 | Pham et al. | 370/241 |
| 2008/0195863 A1 | 8/2008 | Kennedy | |
| 2008/0216168 A1 | 9/2008 | Larson | |

OTHER PUBLICATIONS

Public Key Cryptography. Wikipedia, the free encyclopedia. [retrieved on Sep. 9, 2008]. Retrieved from the Internet: <URL: http://en.wikipedia.org/wiki/Public-key_cryptography>.
Man-in-the-Middle Attack. Wikipedia, the free encyclopedia. [retrieved on Sep. 9, 2008]. Retrieved from the Internet: <URL: http://en.wikipedia.org/wiki/Man-in-the-middle_attack>.

* cited by examiner

*Primary Examiner* — Ashok Patel
*Assistant Examiner* — Brian Shaw
(74) *Attorney, Agent, or Firm* — Hickman Palermo Truong Becker Bingham Wong LLP

(57) ABSTRACT

A system for determining security associations using binary output sequences is described. In an example systematic embodiment, a first device is coupled over a network to a second device. Each device includes a processor and an indicator mechanism coupled to the processor. The indicator mechanism is configured to output a binary representation of a security state established between the devices to a user in perceivable proximity to at least one of the devices. A computer readable storage medium is coupled to the processor and includes executable instructions for the processor. The instructions when executed by the processor initiate a security transaction between the devices. The security transaction includes a protocol that uses one or more public keys to establish a security state between the devices. The indicator mechanism then outputs the binary representation to the user based on the established security state.

33 Claims, 6 Drawing Sheets

DETERMINING SECURITY STATES USING BINARY OUTPUT SEQUENCES

CROSS-REFERENCE TO RELATED APPLICATIONS; PRIORITY CLAIM

Not Applicable

TECHNICAL FIELD

The present disclosure generally relates to networking security and more specifically to determining security relationships between networked devices.

BACKGROUND

Unless otherwise indicated herein, the approaches described in this section are not prior art to the claims in this application and are not admitted to be prior art by inclusion in this section.

A variety of authentication mechanisms are available that may be used to determine the security state of intelligent devices. For example, authentication mechanisms may utilize symmetric, asymmetric and a combination of symmetric and asymmetric cryptographic mechanisms to authenticate one intelligent device to another over a network. In addition, a third party certificate authority may be used to verify the authenticity of the parties involved in secure communications with one another.

The certificate authority is generally responsible for generating digital certificates which provide a chain of trust which can ultimately be used to verify the authenticity of the parties. In addition, the use of a certificate authority may also be used to prevent unintended eavesdropping of confidential conversations between the parties.

However, without a certificate authority, an attacker may be able to surreptitiously insert him or herself between two parties in communications over a communications network even when the parties have attempted to use security measures for the communications. Attacks of this nature are commonly known as man-in-the-middle attacks. A successful man-in-the-middle allows the attacker to read, insert and modify at will, messages between two parties without either party knowing that their communications link has been compromised. Man-in-the-middle attacks become even more difficult to defend against when anonymous key agreement transactions are used without the ability to verify the parties involved in the communications.

DETAILED DESCRIPTION

Figure 1:
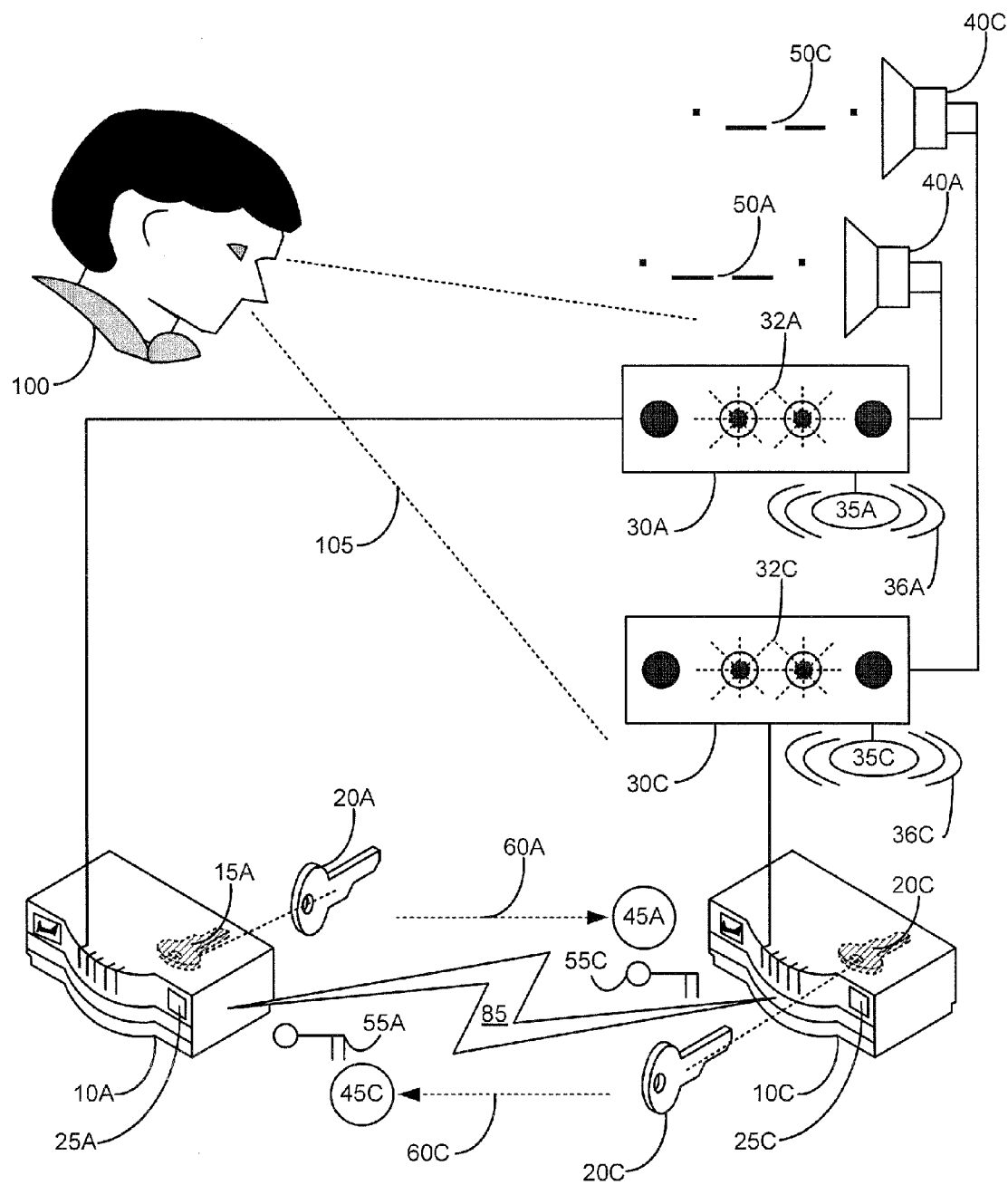
FIG. 1 illustrates two networking devices connected over a network and outputting a binary representation sequence.

A system for determining security associations using binary output sequences is described. In the following description, for the purposes of explanation, numerous specific details are set forth in order to provide a thorough understanding of the present invention. It will be apparent to one skilled in the art that the various inventive embodiments disclosed herein may be practiced with or without these specific details. In other instances, well-known structures and devices are shown in block diagram form in order to simplify the various inventive embodiments disclosed herein.

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments as is defined by the claims.

Embodiments are described herein according to the following outline:
 1.0 General Overview
 2.0 Structural and Functional Overview
 3.0 Binary Outputs for Determining Security States
  3.1 Binary Output Sequences
  3.2 Networking Device Configurations
  3.3 Security Transactions—No Attack Present
  3.4 Security Transactions—Attack Present
  3.5 Operational Process
 4.0 Implementation Mechanisms—Hardware Overview
 5.0 Extensions and Alternatives
 1.0 General Overview A system for determining security states using binary output sequences is described. In an embodiment, a first device is coupled over a network to a second device. Each device includes a processor and in indicator mechanism coupled to the processor. The indicator mechanism is configured to output a binary representation of a security state of the devices wherein the output is perceivable from at least one of the devices.

In an embodiment, a computer readable storage medium is coupled to the processor and includes executable instructions for the processor. The instructions when executed by the processor cause the processor to initiate a security transaction between the devices. The security transaction includes a protocol that uses one or more public keys to establish a security state between the devices. The processor then causes the indicator mechanism to output the binary representation to the user based on the established security state.

In an example embodiment, user interface logic is coupled to the processor of at least one of the two devices. When activated by the user, the interface logic causes the processor to initiate the security transaction between the devices and allows the user to permissively accept the security state established between the devices in dependence on the user perceiving a correspondence of the outputted binary representations.

In various example systematic embodiments, the binary representation comprises a time dependent sequence of audible, visual or tactile output responses; the indicator mechanism of at least one of the devices may be configured to output the binary representation on all LED display; the first device is coupled to the second device over a wireless communications link; the security transaction includes a key agreement protocol, the key agreement protocol including an exchange of RSA or Diffie-Hellman public keys; the security state is dependent on a correspondence of shared symmetric keys established between the first and second devices; the instructions that cause the processor to perform the security transaction further comprise instructions to perform an exchange of credentials containing the cryptographic keys and key agreement parameter data; the outputted binary representation is based on the shared symmetric keys established between the first and second devices; and the outputted binary representation may be derived from the shared symmetric keys using a one way function.

In other example embodiments, a computer implemented method and a computer-readable medium are configured to carry out the foregoing processor instructions.

2.0 Structural and Functional Overview

In various networking situations, users frequently configure intelligent devices such as routers, bridges, switches, gateways, print servers, network printers, networked storage devices and other network appliances to communicate with one another. While these networking devices are capable of being programmed to perform a variety of networking and security functions, the user interface and displays supplied with these devices can include one or more binary state switches, one or more light emitting diodes (LED), miniature liquid crystal displays (LCD), audio buzzers or speakers and possibly vibratory annunciators. These rudimentary user interface and display capabilities limit a user's ability to ensure that a networked device is actually communicating securely with another networked device, particularly when the networked devices are operating in a wireless networking environment, and do not provide information about the security level of the communication.

As such, a networked device may be the subject of a man-in-the-middle attack which could allow an attacker to read, insert and modify at will, messages and other data sent over the network without any indication that one or more portions of the network have been compromised. One way to defeat man-in-the-middle attacks is to exchange digital certificates which incorporate a verifiable digital signature. The digital signature binds an asymmetric public key with the identity of a person or organization. The binding of the digital signature with the identity of the person or organization is usually performed by a third party certificate authority that provides a chain of trust. This arrangement works well for people and organizations but is impractical for networking devices when there is no apparent trusted third party available.

Even if it were possible to separately assign verifiable third party digital certificates to the networking devices, maintaining a chain of trust would be difficult and expensive since these networked devices are purchased, sold, swapped in- and-out of service, and occasionally disposed of. As such, maintaining the chain of trust would require a security infrastructure which would be beyond the capability of consumer users and most small to medium size businesses.

To inhibit man-in-the-middle attacks, it is therefore desirable to establish security associations which utilize robust cryptographic mechanisms between the networking devices, may be implemented with existing user interfaces and displays, do not require a trusted third party and/or does not require security peripherals such as security tokens to be used.

3.0 Binary Outputs for Determining Security States

Referring to FIG. 1, an example embodiment is depicted in which two networking devices 10A, 10C are connected over a network 85 and are outputting a binary representation sequence. At least one networking device includes a simple display 30A, 30C, an audio output device 40A, 40C and/or a vibratory annunciator 35A, 35C which may be used to determine if a security state has been established over the network 85 between the two networking devices 10A, 10C. In this example embodiment, a user 100 arranges the two devices 10A, 10C such that the displays 30A, 30C or other output devices 35A, 35C, 40A, 40C are perceivable 105 by the user 100.

As referred to herein, the term "perceived" means detected by way of human senses and includes visually observed outputs, audibly heard outputs and/or tactilely felt outputs. However, the user 100 does not need to be physically present. For example, another user may be monitoring the output from a remote networking device and communicating with the first user over a telephone or some other out of band mechanism. Alternately, the first user may be monitoring both networking devices 10A, 10C remotely using video cameras and/or other multimedia devices.

Each device 10A, 10C includes an asymmetric key pair consisting of a private key 15A, 15C and a public key 20A, 20C. The asymmetric key pairs are used in conjunction with a key agreement protocol to generate a pair of shared symmetric keys 55A, 55C. The asymmetric key pairs 15A, 20A, 15C, 20C are retrievably stored in a non-volatile memory within each networking device 10A, 10C or may be generated on an "as needed" basis. To minimize computational efforts, the asymmetric key pairs 15A, 20A, 15C, 20C may be generated using elliptical curve algorithms.

The key agreement protocol includes but is not limited to the public key infrastructures (PKI) developed by Ron Rivest, Adi Shamir and Leonard Adleman (hereinafter "RSA"); Whitfield Diffie, Martin Hellman and Ralph Merkle (hereinafter "Diffie-Hellman"); and Pretty Good Privacy (hereinafter "PGP") developed by Philip Zimmermann. All three public key infrastructure protocols are well known.

In this example embodiment, a momentary switch 25A, 25C is provided on at least one of the network devices 10A, 10C to initiate a security transaction with the other networked device. In all alternate example embodiment, the security transaction may be initiated automatically, for example as part of a power on boot sequence or executed as a separate script thereafter. In yet another embodiment, the security transaction results from inserting a device containing a symmetric secret using a USB flash drive, the secret being placed on the USB flash drive by one network device and copied by the second thereby installing a pre-shared secret from one device to the other. Alternatively, a memory "dongle" or similar device may be used.

The initiation of the security transaction causes each networked device 10A, 10C to exchange 60A, 60C public keys 20A, 20C and key agreement parameters 45A, 45C over the network 85. The exchanged key agreement parameters 45A, 45C vary depending on the key agreement protocol employed, but all result in the generation of a pair of symmetric keys 55A, 55C which are used for performing block cryptography between the networked devices 10A, 10C after a determination has been made that each generated symmetric key 55A, 55C is identical to its counterpart maintained by the other networked device.

Once a pair of symmetric keys 55A, 55C has been generated, the security transaction causes each networking device 10A, 10C to output binary representations 32A, 32C of at least a portion of the generated symmetric keys 10A, 10C. The binary representations may be output visually on an LED or LCD display 30A, 30C, audibly output 50A, 50C using internal buzzers or speakers 40A, 40C or tactilely 36A, 36C output from vibratory annunciators 35A, 35C. The binary representations are perceived 105 by the user 100 and if a perceivable match exists, the networking devices 10A, 10C have established a secure connection of the network 85.

A value of each bit determines the state of the output device. For example, a '0' value is not output to the displays 30A, 30C while a '1' value is output. Visually, a '0' bit corresponds to a non-illuminated LED while a '1' bit corresponds to an illuminated LED. Alternately, the audio outputs 50A, 50C and/or vibratory outputs 36A, 36C may be provided in a type of Morse code, where a '0' represents a 'dit' and a '1' represents a 'dah.' Other arrangements, such as outputting different tones for the binary values will work as well.

If the binary representations do not perceivably match, the network devices may be the subject of a man-in-the middle attack and the security state is considered compromised or unsafe to continue. In an example embodiment, the momentary switches 25A, 25C may be used to accept or reject the established security state based on the results of the output binary representations as is discussed below.

3.1 Binary Output Sequences

Figure 2:
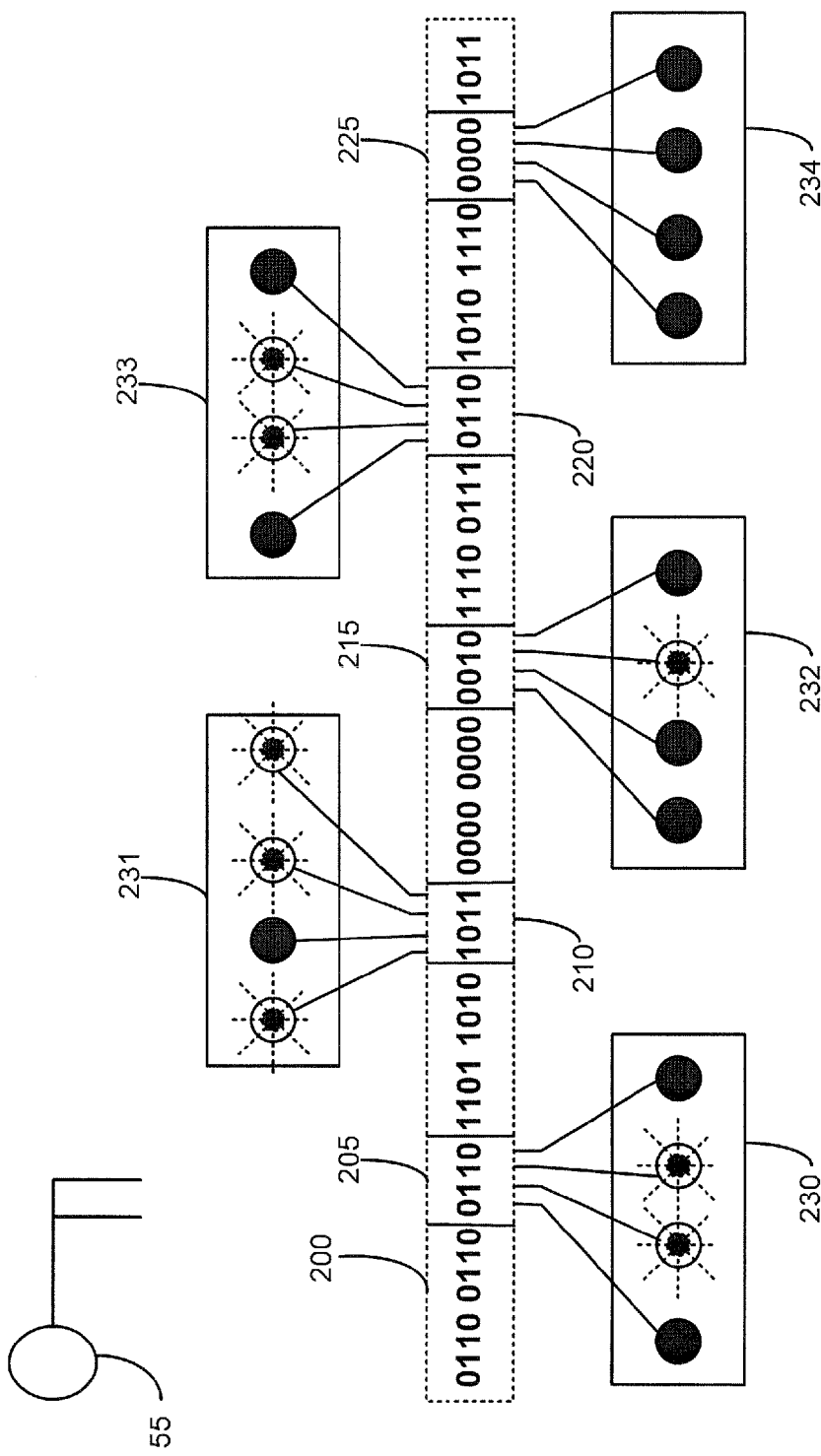
FIG. 2 illustrates an example outputted binary representation sequence obtained from a shared symmetric key.

FIG. 2 depicts an example outputted binary representation sequence 230, 231, 232, 233, 234 obtained or derived from a portion of a shared symmetric key 55 which is output as a binary sequence 200. In most situations, a shared symmetric key 55 will have a bit strength of at least 128 bits to prevent an attacker from guessing the shared symmetric key. As such, the bit sequence to be output may be selected from anywhere within the key and still not disclose sufficient information to allow an attacker to guess the value of the shared symmetric key should he or she be in a position to perceive the output sequence.

In this example embodiment, the output sequence 230, 231, 232, 233, 234 is obtained from every third nibble 205, 210, 215, 220, 225 of the binary sequence 200 which comprises the symmetric key 55. A nibble was arbitrarily chosen for use with a display having four LED's available for display purposes. Other arrangements may use a different set of bits selected from one or more predetermined locations within the binary sequence 200 which comprises the symmetric key 55.

In an example embodiment, using the four lamp LED display example shown in FIG. 1, the first binary sequence of '0110' 205 causes the second and third LEDs to be illuminated 230; the second selected binary sequence of '1011' 210 causes the first, third and fourth LEDs to be illuminated 231; the third selected binary sequence of '0010' 215 causes the third and fourth LEDs to be illuminated 232; the fourth selected binary sequence of '0110' 220 causes the second and third LEDs to be illuminated 233; and lastly, the fifth selected binary sequence of '0000' 225 causes the LEDs to remain off 234. The length of time each selected binary sequence 205, 210, 215, 220, 225 remains illuminated may be programmatically set to allow the user to be able to compare the outputs from each networking device 10A, 10C. For example, each set of bits may be displayed at about 100 millisecond intervals.

A hash, message authentication code, message digest or other one way function may be used to reduce the number of bits to be output which also provides the benefit of further obfuscating the binary output of the symmetric key 55. In an alternative example embodiment, the output sequence may be determined by converting a set of bytes into decimal equivalent values and outputting only the odd or even decimal equivalent values.

3.2 Networking Device Configurations

Each networking device 10A, 10C is programmed with identical algorithms for performing the key agreement protocol and generating and outputting the binary sequence of the established shared symmetric keys. The programs used to implement the various example embodiments may be written using any high level language which supports the public key infrastructure of choice. For example, the programming languages of C++ and Java have extensive cryptographic libraries and extensions available which includes the RSA, Diffie-Hellman and PGP public key protocols.

3.3 Security Transactions—No Attack Present

Figure 3A:
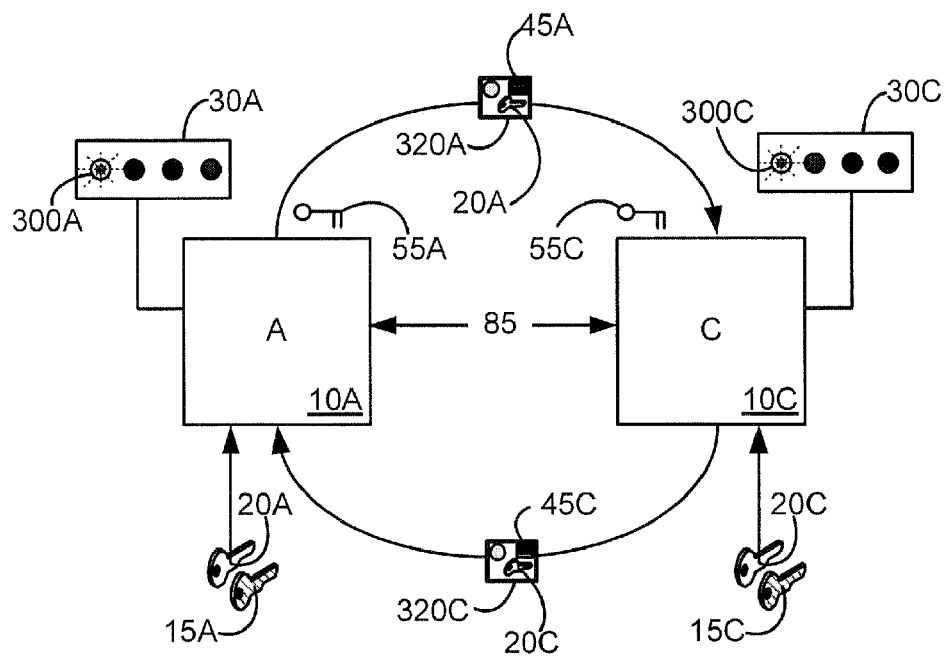
FIGS. 3A and 3B illustrate determining a security state between a first and second networking device over a network without the presence of a man-in-the-middle attack.
Figure 3B:
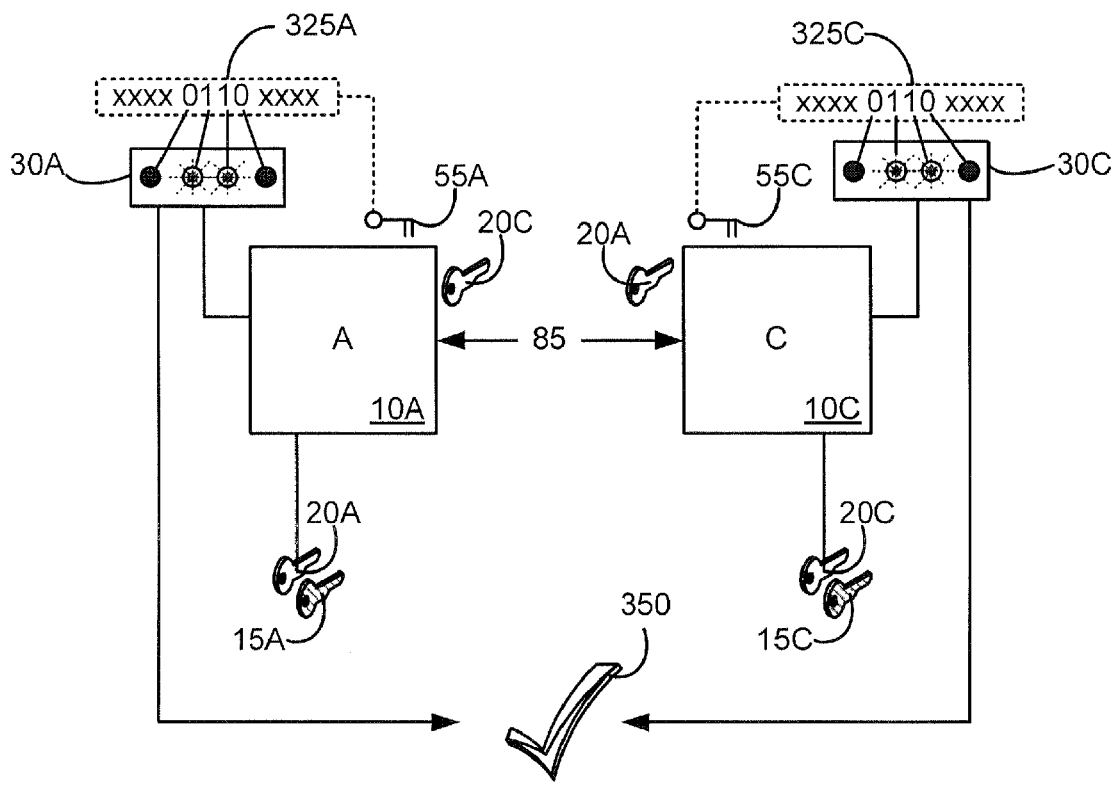

FIGS. 3A and 3B depict an example embodiment for determining a security state between a first 10A and second networking device 10C over a network 85 without the presence of a man-in-the-middle attack. The network 85 may be a hardwired, a wireless arrangement or a combination thereof. As previously discussed, the user 100 may initiate the security association process by pressing a momentary switch 25A, 25C on one or both networking devices 10A, 10C. In an example embodiment, the programmatic instructions cause the networking device A 10A to send a copy of its public key 20A and key agreement parameter data 45A to the receiving networking device C 10C. In an example embodiment, a binary signal is output 300A from a display 30A indicating that the networking device A 10A has entered a security association mode. A complementary binary signal may also be output 300C from the display 30C of the receiving networked device C 10C.

The key agreement parameter data 45A sent to the receiving networking device C 10C is dependent on the particular key agreement protocol being employed. For example, if the key agreement protocol being employed is Diffie-Hellman, the key agreement parameter data includes an agreed prime number and a base number to generate the shared symmetric key pair 55A, 55C. If the key agreement protocol being employed is RSA or PGP, the key agreement parameter data 45A, 45C includes a modulo value and random text encrypted with the public keys 20A, 20C of each networking device 10A, 10B. Each recipient networking device decrypts the other device's random text using its private key 15A, 15B and combines the resulting text to generate the shared symmetric keys 55A, 55C.

Combining the two random texts ensures both devices 10A, 10C have influenced the generation of the shared symmetric keys 55A, 55C. The combining operation may be performed by a number of different methods, for example using the logical function XOR. The combining operation is generally performed in accordance with the particular public key infrastructure protocol.

The key agreement parameter data 45A, 45C and public keys 20A, 20C may be exchanged using a form of digital certificate 310A, 310C or in one or more cookies. The digital certificates 310A, 310C do not need to conform to existing X.509 standards, since the user will be acting as a type of certificate authority. The key agreement parameter data 45A, 45C may also include the public key infrastructure protocol to be employed.

Referring to FIG. 3B, once the shared symmetric keys 55A, 55B have been established, a binary representation of a portion of the shared symmetric keys is output such that the binary representations '0110' 325A, '0110' 325C can easily be compared on the displays 30A, 30C by the user. Each networking device 10A, 10C outputs the resulting binary representation sequences 325A, 325C separately but in concert with its counterpart device. Since, the shared symmetric keys 55A, 55C were generated with random text and combined at each networking device 10A, 10C the resulting binary representations 325A, 325C should be identical, thus ensuring that a safe security state has been established over the network 85 between the two networking devices 10A,

10C. The correspondence of the resulting binary representation sequences 325A, 325C is verified 350 by the user 100.

In an example embodiment, the user 100 presses the momentary switch 25A, 25C on one or both networking devices 10A, 10C to accept the security association. In an example embodiment, if the user does not accept the current security association within a predetermined amount of time, the present security association is discarded. Given the simplicity of the verification method, five minutes should be more than adequate.

In an example embodiment, the shared symmetric keys 55A, 55C may be subjected to a one-way function to further obfuscate the binary representations outputted 30A, 30C to the user 100. The one way function may be formed using SHA-1, MD-5, HMAC, MAC or any other keyed or unkeyed message digest function. The derived result of the one way function is then output as a binary representation sequence as previously discussed. The one way function may also be used to combine the random text generated by the two networking devices 10A, 10C.

3.3 Security Transactions—Attack Present

Figure 3C:
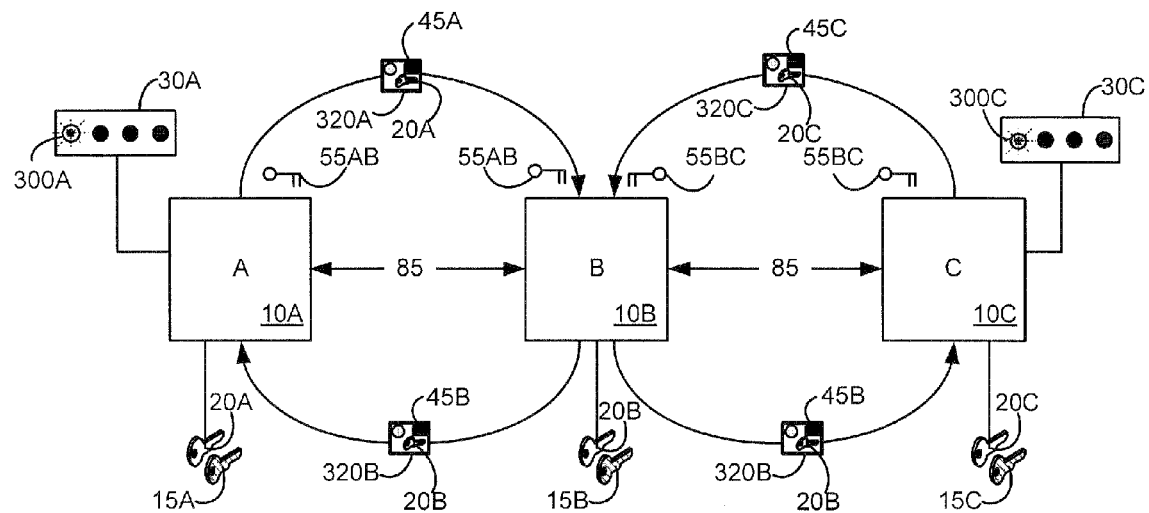
FIGS. 3C and 3D illustrate determining a security state between a first and second networking device over a network in the presence of a man-in-the-middle attack.
Figure 3D:
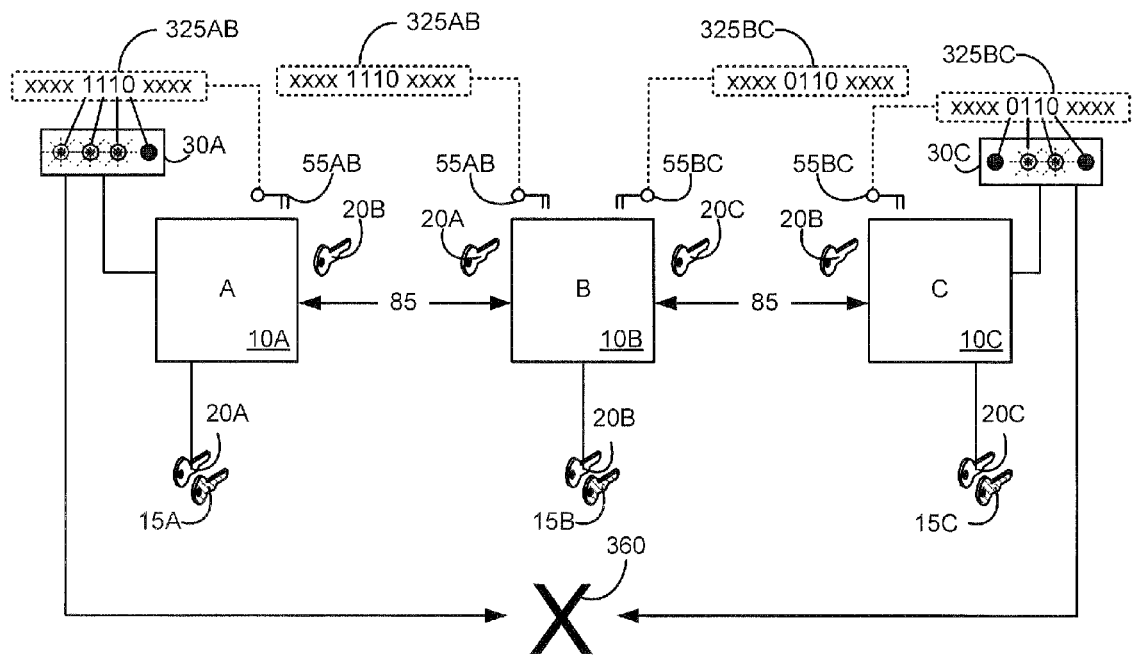

FIGS. 3C and 3D depict an example embodiment for determining a security state between a first 10A and a second networking device 10C over a network 85 in the presence of a man-in-the-middle attack. In an example embodiment, an attacker 10B has inserted himself on the network 85 between the each networking device 10A, 10C such that all communications between the networking devices 10A, 10C must go through the attacker B 10B. In this example embodiment, the user 100 initiates the security association from one or both networking devices 10A, 10C as previously described.

However, in this example embodiment, each networking device 10A, 10C exchanges copies of their public keys 20A, 20C and key agreement parameters 45A, 45C with the attacker 10B. Likewise, the attacker B 10B exchanges copies of his or her public key 20B and key agreement parameters 45B with both networking devices 10A, 10C. The key agreement protocol prescribed by the public key infrastructure employed results in two sets of shared symmetric keys 55AB, 55BC. The first set of shared symmetric keys 55AB is generated between the networking device A 10A and the attacker B 10B. The second set of shared symmetric keys 55BC is generated between the networking device C 10C and the attacker B 10B.

Since the public key infrastructure requires that each network device contribute to the generation of the shared symmetric keys 55AB, 55BC, the attacker B 10B cannot simply substitute one set of generated keys 55AB for the other 55BC. In addition, since the shared symmetric keys 55AB, 55BC are generated using random text, the attacker cannot simply guess what information will be provided by each networking device 10A, 10C to generate the shared symmetric keys 55AB, 55BC. Thus, the attacker 10B is forced to generate two different sets of shared symmetric keys 55AB, 55BC; each set of shared symmetric keys 55AB, 55BC being completely different due to the randomness introduced by the random text contribution provided the networking devices 10A, 10C to the resulting shared symmetric keys 55AB, 55BC.

To complete the security transaction, each networking device 10A, 10C outputs the resulting binary representation sequence '1110' 325AB and '0110' 325BC obtained from or derived from its shared symmetric keys 55AB, 55BC resulting in different binary representation sequences 325AB, 325BC being displayed 30A, 30C by each networking device 10A, 10C. The user 100 perceiving 105 the difference in the outputted binary representation sequences 325AB, 325BC should now be aware that one or both of the networking devices 10A, 10C is under a man-in-the-middle attack and should not accept the current compromised security state 360.

3.4 Operational Process

Figure 4:
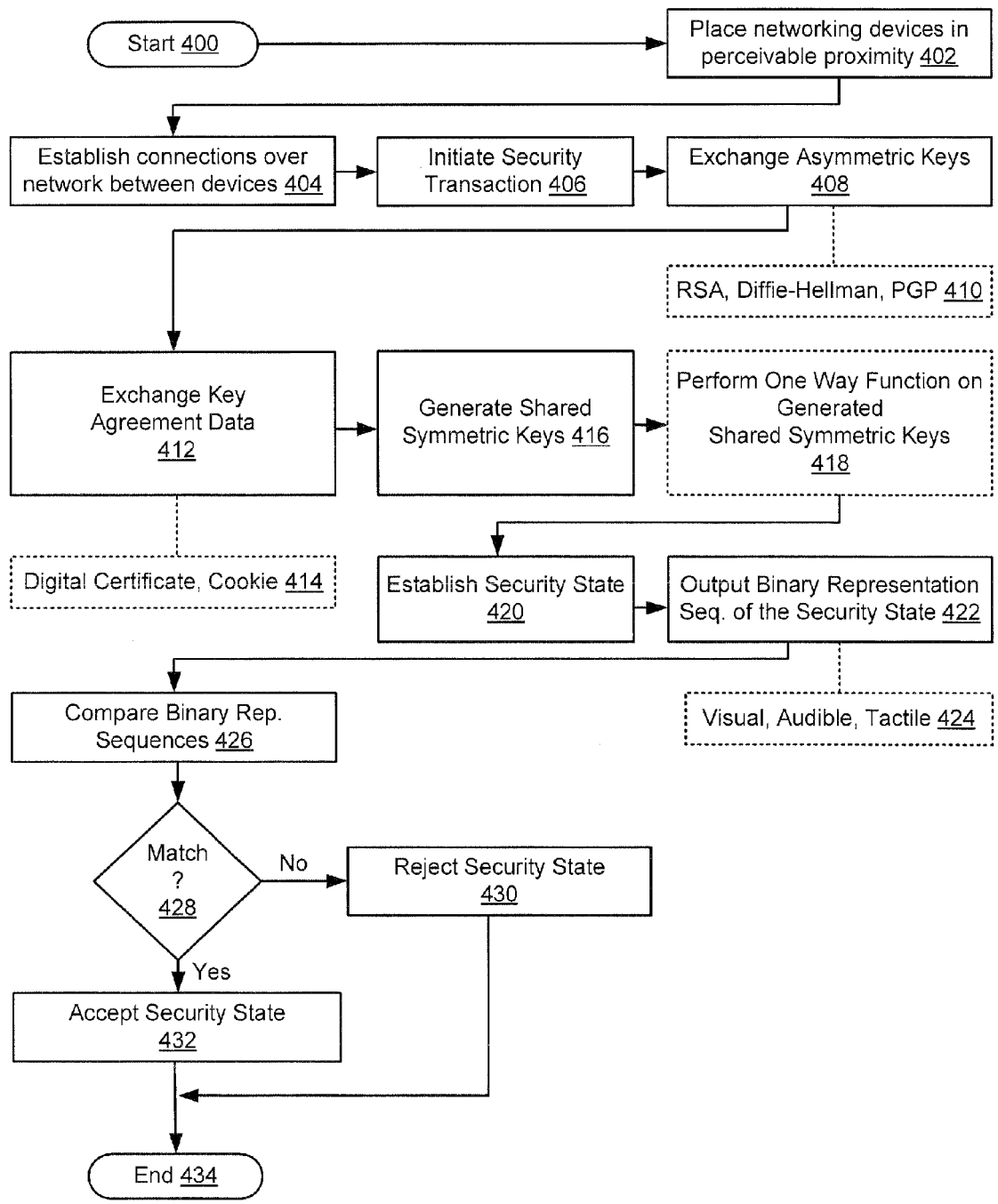
FIG. 4 illustrates determining a security state using outputted binary representation sequences.

FIG. 4 depicts an example process flow chart for determining a security state using outputted binary representation sequences. The process is initiated 400 by a user placing two networking devices so that the output of both devices is perceivable to the user 402. The networking devices may then be connected to a network 404 and configured to initiate a security transaction therebetween 406. The network devices execute a public key infrastructure protocol which exchanges asymmetric public keys 408 over the network. The public key infrastructure protocol may utilize defined protocols for RSA, Diffie-Hellman or PGP 410 key agreements. The exchanged asymmetric public keys are accompanied therewith or thereafter by an exchange of key agreement data 412. The key agreement data includes the key agreement parameter data required to implement the public key infrastructure protocol employed. In an example embodiment, the key agreement data may be exchanged between the networking devices using a digital certificate or a cookie 414. The digital certificate does not need to conform to X.509 standards.

The exchanged public keys and key agreement data are then used to generate a set of shared symmetric keys 416. In an example embodiment, a one way function may be performed on the generated shared symmetric keys 418. The result derived from the one way function may be used to further obfuscate the shared symmetric keys. Once the shared symmetric keys are ready for use, a security state is established 420 between the networking devices. The security state may be safe or compromised. Each networking device then separately outputs a binary representation sequence in concert with its counterpart of the generated shared symmetric keys 422 or a derivative thereof if processed by the one way function 418.

The outputted binary representation sequences are compared by the user 426. If the perceived binary representation sequences match 428, a safe security state has been established between the networking devices and the user should accept the current security state 432. The process terminates after the security state is determined to be safe and should be accepted 434. Alternately, if the perceived binary representation sequences do not match 428, a compromised security state has been established between the networking devices in which one or both networking devices is the subject of a man-in-the middle attack. The current security state should be rejected by the user 430. The process terminates after the compromised security state is rejected 434.

4.0 Implementation Mechanisms—Hardware Overview

Figure 5:
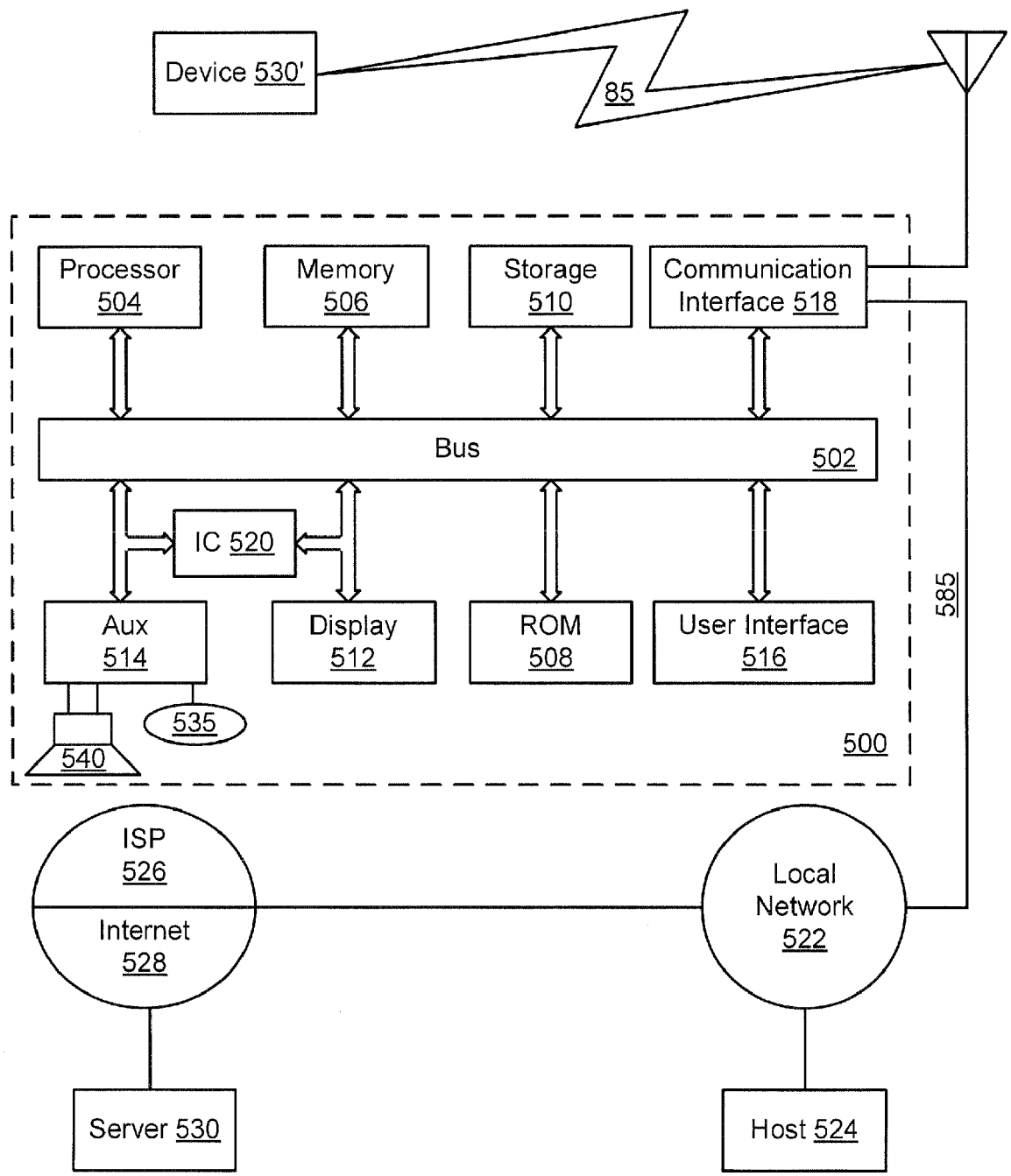
FIG. 5 illustrates a computer system upon which the various example embodiments may be implemented.

FIG. 5 depicts a computer system 500 upon which the various example embodiments may be implemented. The computer system 500 includes a bus 502 or other communication mechanism for communicating information, and a processor 504 coupled to a bus 502 for processing information. The computer system 500 also includes a main memory 506, such as a random access memory (RAM), flash memory, or other dynamic storage device, coupled to the bus 502 for storing information and instructions to be executed by the processor 504. The main memory 506 also may be used for storing temporary variables or other intermediate information during execution of instructions to be executed by the processor 504. The processor 504 may be of a general purpose complex instruction set computer (CISC) processor commonly associated with desktop computer systems. In an example embodiment, the processor 504 may be a reduced instruction set computer (RISC) processor. In another example embodiment, the processor 504 may be application-specific integrated circuit (ASIC) which is programmed to perform a particular function. In an example embodiment, the processor ray be programmed to execute the processes depicted in FIG. 4.

The computer system 500 further includes a read only memory (ROM) 508 or other static storage device coupled to the bus 502 for storing static information and instructions for the processor 504. A storage device 510, such as a magnetic disk, flash memory or optical disk, may be provided and coupled to the bus 502 for storing information and instructions.

A communication interface 518 is coupled to the bus 502 for communicating information, interrupts and commands to the processor 504. The communications interface 518 may be a conventional serial interface such as an RS-232, RS-422, USB, Firewire™ or an 802.11 network interface. In an example embodiment, a display 512 is coupled to the bus 502 for visually outputting both graphical displays and alphanumeric characters to a user. In another example embodiment, the display 512 is a miniature LCD screen or one or more LEDs for outputting security state information to the user.

A user interface 516 is coupled to the bus 502 for sending interrupt signals to the processor 504 that are used to interpret user interactions with the computer system 500. The user interface 516 may be used in conjunction with the display 512. Firmware or software running in the computer system 500 allows external commands to be sent to the computer system 500 via the communications interface 518.

An auxiliary interface 514 is provided for outputting security state information using a vibratory annunciator 535 or a speaker or buzzed 540 to the user. An indicator mechanism 520 is provided for causing the auxiliary interface 514 and/or the display 512 to output a security state to the user.

The communications interface 518 may be coupled to one or more external networks 85, 522. The external networks include a local network 522 coupled to one or more hosts 524, or a global network such as Internet 528 having one or more servers 530 or another networking device 530' via a wireless network 85.

The various example embodiments are related to the use of the computer system 500 for determining security states using binary output sequences. According to one example embodiment, determining security states using binary output sequences are provided by computer system 500 in response to the processor 504 executing one or more sequences of one or more instructions contained in main memory 506. Such instructions may be read into the main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in the main memory 506. In alternative embodiments, hard-wired circuitry or firmware may be used in place of or in combination with software instructions to implement the invention. Thus, the various example embodiments are not limited to any specific combination of hardware circuitry and software.

The term "computer-readable medium" as used herein refers to any medium that participates in providing instructions to the processor 504 for execution. Such a medium may take many forms, including but not limited to non-volatile media, volatile media, and transmission media. Non-volatile media includes, for example, optical or magnetic disks, such as storage device 510. Volatile media includes dynamic memory, such as the main memory 506. Transmission media includes coaxial cables, copper wire and fiber optics, including the wires and conductive traces that comprise the bus 502. The transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 504 for execution. For example, the instructions may initially be carried on a magnetic disk of a remote computer or server 530. The remote computer 530 can load the instructions into its dynamic memory and send the instructions over a telephone line using a modem. A modem local to the computer system 500 can receive the data on the telephone line and use an infrared transmitter to convert the data to an infrared signal. An infrared detector coupled to the bus 502 can receive the data carried in the infrared signal and place the data on the bus 502. The bus 502 carries the data to the main memory 506, from which the processor 504 retrieves and executes the instructions. The instructions received by the main memory 506 may optionally be stored on the storage device 510 either before or after execution by the processor 504.

The communication interface 518 also provides a two-way data communication coupling to a network link 585 that is connected to a local network 522. For example, the communication interface 518 may be an integrated services digital network (ISDN) card or a modem to provide a data communication connection to a corresponding type of telephone line. As another example, the communication interface 518 may be a local area network (LAN) card to provide a data communication connection to a compatible LAN. Wireless links 85 may also be implemented. In any such implementation, the communication interface 518 sends and receives electrical, electromagnetic or optical signals that carry digital data streams representing various types of information.

The network link 585 typically provides data communication through one or more networks to other data devices. For example, the network link 585 may provide a connection through the local network 522 to a host computer 524 or to data equipment operated by an Internet Service Provider (ISP) 526. The ISP 526 in turn provides data communication services through the worldwide packet data communication network now commonly referred to as the "Internet" 528. The local network 522 and Internet 528 both use electrical, electromagnetic or optical signals that carry digital data streams. The signals through the various networks and the signals on the network link 585 and through the communication interface 518, which carry the digital data to and from the computer system 500, are example forms of carrier waves transporting the information.

The computer system 500 can send messages and receive data, including programmatic code, through the network(s), network link 585 and communication interface 518. In the Internet 528 example, a server 530 might transmit a requested code for an application program through the Internet 528, ISP 526, the local network 522, the network link 585 and the communication interface 518. In accordance with the various example embodiments, one such downloaded application provides for determining security states using binary output sequences as described herein.

The received code may be executed by the processor 504 as it is received, and/or stored in storage device 510, or other non-volatile storage for later execution. In this manner, computer system 500 may obtain application code in the form of a carrier wave.

5.0 Extensions and Alternatives

The various example embodiments described above may be extended to other networking devices. For example a cellular phone or portable media player might leverage the security states by cryptographically binding of peer devices for sharing photographs, encrypted text messages and other data. In addition, the various example embodiments could also be used for garage door openers, wireless key systems and related automotive implementations.

The various example inventive embodiments described herein are intended to be merely illustrative of the principles underlying the inventive concept. It is therefore contemplated that various modifications of the disclosed embodiments will, without departing from the inventive spirit and scope, be apparent to persons of ordinary skill in the art. They are not intended to limit the inventive embodiments to any precise form described. In particular, it is contemplated that functional implementation of the various inventive embodiments described herein may be implemented equivalently in hardware, software, firmware, and/or other available functional components or building blocks. No specific limitation is intended to a particular arrangement or programmatic sequence. Other variations and inventive embodiments are possible in light of above teachings, and it is not intended that this Detailed Description limit the inventive scope, but rather by the Claims following herein.

What is claimed is:

1. An apparatus, comprising:
   a processor;
   a communication interface;
   an indicator mechanism, which, when activated, outputs binary information perceivable to a user of at least one of the apparatus and another device;
   a computer readable storage medium coupled to the processor comprising instructions which when executed by the processor cause the processor to:
   initiate a security transaction between the apparatus and the other device, the security transaction using one or more public keys according to a protocol to establish a shared secret state between the apparatus and the other device;
   wherein both the apparatus and the other device contribute to the shared secret state;
   and
   cause the indicator mechanism to output a binary sequence such that the binary sequence is perceivable to the user, wherein the binary sequence represents at least some noncontiguous bits of a representation of the shared secret state.

2. The apparatus of claim 1 further comprising user interface logic coupled to the processor of at least one of the apparatus and the other device, wherein activation of the user interface logic by the user causes initiating the security transaction between the apparatus and the other device and permissively accepting the shared secret state established between the apparatus and the other device.

3. The apparatus of claim 1 further comprising instructions which when executed cause permissively accepting the shared secret state established between the apparatus and the other device in response to a correspondence, perceived by the user, of the outputted binary sequence and another binary sequence.

4. The apparatus according to claim 1 wherein the binary sequence comprises a time dependent sequence of audible, visual or tactile output responses.

5. The apparatus according to claim 1 wherein at least one of the indicator mechanism of the apparatus and a second indicator mechanism of the other device, when activated, outputs the binary sequence on an LED display.

6. The apparatus according to claim 1 wherein the security transaction uses a key agreement protocol for exchanging RSA or Diffie-Hellman public keys or keys using PGP.

7. The apparatus according to claim 1 wherein the shared secret state is dependent on a correspondence of shared symmetric keys established between the apparatus and the other device.

8. The apparatus according to claim 1 wherein instructions when executed cause performing an exchange of credentials containing the public keys and key agreement parameter data.

9. The apparatus according to claim 1 wherein the outputted binary sequence is derived from shared symmetric keys using a one way function.

10. The apparatus according to claim 1, wherein the at least some noncontiguous bits of the shared secret state comprise selected nibbles of the representation of the shared secret state.

11. The apparatus according to claim 1, wherein the indicator mechanism outputs a first set of binary information items in the binary sequence before the indicator mechanism outputs a second set of binary information items in the binary sequence.

12. A non-transitory computer readable storage medium encoded with instructions which, when executed by a first network device, cause the first network device to:
   initiate a security transaction between the first network device and a second network device over a network, wherein the security transaction uses one or more public keys according to a protocol to establish a shared secret state between the devices;
   wherein both the first network device and the second network device contribute to the shared secret state;
   and
   output a binary sequence such that the binary sequence is perceivable to a user of at least one of the devices, wherein the binary sequence represents at least some noncontiguous bits of a representation of the shared secret state.

13. The non-transitory computer-readable storage medium of claim 12, wherein the instructions when executed cause the first network device to provide a user interface to the user, wherein activation of the user interface by the user causes initiating the security transaction between the devices and permissively accepting the shared secret state established between the devices.

14. The non-transitory computer-readable storage medium of claim 12, wherein the instructions when executed cause permissively accepting the shared secret state established between the devices in response to a correspondence, perceived by the user, of the outputted binary sequence and another binary sequence.

15. The non-transitory computer-readable storage medium of claim 12, wherein the binary sequence comprises a time dependent sequence of audible, visual or tactile output responses.

16. The non-transitory computer-readable storage medium of claim 12, wherein the instructions when executed cause outputting the binary sequence on an LED display of at least one of the first network device or the second network device.

17. The non-transitory computer-readable storage medium of claim 12, wherein the security transaction uses a key agreement protocol for exchanging RSA or Diffie-Hellman public keys or keys using PGP.

18. The non-transitory computer-readable storage medium of claim 12, wherein the shared secret state is dependent on a correspondence of shared symmetric keys established between the devices.

19. The non-transitory computer-readable storage medium of claim 12, wherein instructions when executed cause performing an exchange of credentials containing the public keys and key agreement parameter data.

20. The non-transitory computer-readable storage medium of claim 12, wherein the outputted binary sequence is derived from shared symmetric keys using a one way function.

21. The non-transitory computer-readable storage medium of claim 12, wherein the at least some noncontiguous bits of the shared secret state comprise selected nibbles of the representation of the shared secret state.

22. The non-transitory computer-readable storage medium of claim 12, wherein the instructions, when executed, cause outputting the binary sequence by outputting a first set of binary information items in the binary sequence before the indicator mechanism outputs a second set of binary information items in the binary sequence.

23. A method comprising:
  initiating a security transaction between a first network device and a second network device over a network, wherein the security transaction uses one or more public keys according to a protocol to establish a shared secret state between the devices;
  wherein both the first network device and the second network device contribute to the shared secret state; and
  outputting a binary sequence such that the binary sequence is perceivable to a user of at least one of the devices, wherein the binary sequence represents at least some noncontiguous bits of a representation of the shared secret state;
  wherein the method is performed by the first network device.

24. The method of claim 23, further comprising providing a user interface to the user, wherein activation of the user interface by the user causes initiating the security transaction between the devices and permissively accepting the shared secret state established between the devices.

25. The method of claim 23, further comprising permissively accepting the shared secret state established between the devices in response to a correspondence, perceived by the user, of the outputted binary sequence and another binary sequence.

26. The method of claim 23, wherein the binary sequence comprises a time dependent sequence of audible, visual or tactile output responses.

27. The method of claim 23, wherein outputting the binary sequence comprises outputting the binary sequence on an LED display of at least one of the first network device or the second network device.

28. The method of claim 23, wherein the security transaction uses a key agreement protocol for exchanging RSA or Diffie-Hellman public keys or keys using PGP.

29. The method of claim 23, wherein the shared secret state is dependent on a correspondence of shared symmetric keys established between the devices.

30. The method of claim 23, further comprising performing an exchange of credentials containing the public keys and key agreement parameter data.

31. The method of claim 23, wherein the outputted binary sequence is derived from shared symmetric keys using a one way function.

32. The method of claim 23, wherein the at least some noncontiguous bits of the shared secret state comprise selected nibbles of the representation of the shared secret state.

33. The method of claim 23, wherein outputting the binary sequence comprises outputting a first set of binary information items in the binary sequence before the indicator mechanism outputs a second set of binary information items in the binary sequence.

* * * * *